US012731714B2

(12) United States Patent
Umeki et al.

(10) Patent No.: US 12,731,714 B2
(45) Date of Patent: Sep. 8, 2026

(54) COIL DEVICE AND ELECTRONIC CIRCUIT

(71) Applicant: TDK CORPORATION, Tokyo (JP)

(72) Inventors: Riku Umeki, Tokyo (JP); Kiyofumi Fujiwara, Tokyo (JP); Koki Murata, Tokyo (JP); Youli Yao, Lincolnshire, IL (US)

(73) Assignee: TDK CORPORATION, Tokyo (JP)

( * ) Notice: Subject to any disclaimer, the term of this patent is extended or adjusted under 35 U.S.C. 154(b) by 940 days.

(21) Appl. No.: 17/969,832

(22) Filed: Oct. 20, 2022

(65) Prior Publication Data

US 2024/0136101 A1 Apr. 25, 2024
US 2024/0234002 A9 Jul. 11, 2024

(51) Int. Cl.
*H01F 27/28* (2006.01)
*H01F 17/04* (2006.01)

(52) U.S. Cl.
CPC ....... *H01F 17/045* (2013.01); *H01F 27/2828* (2013.01)

(58) Field of Classification Search
CPC .. H01F 17/045; H01F 27/2828; H01F 27/255; H01F 27/2847; H01F 3/14; H01F 27/2852; H01F 27/292; H01F 2003/106; H01F 3/10; H01F 17/04; H01F 27/24; H01F 27/28; H01F 27/306; H01F 2017/048
USPC .......................................................... 336/221
See application file for complete search history.

(56) References Cited

U.S. PATENT DOCUMENTS

2010/0308950 A1* 12/2010 Hsieh ........................ H01F 3/10 336/221
2023/0100669 A1* 3/2023 Yamamoto ................ H01F 3/10 336/233
2023/0131138 A1* 4/2023 Liang ..................... H01F 27/266 336/83
2023/0215611 A1* 7/2023 Huang .................. H01F 27/306 336/83
2023/0238166 A1* 7/2023 Kobayashi .............. H01F 27/25 336/221

FOREIGN PATENT DOCUMENTS

JP 2022-033703 A 3/2022

* cited by examiner

*Primary Examiner* — Shawki S Ismail
*Assistant Examiner* — Kazi S Hossain
(74) *Attorney, Agent, or Firm* — Oliff PLC

(57) ABSTRACT

A coil device including a first conductor, a second conductor located inside the first conductor, a first inner core located inside the second conductor, and a second inner core located between the first conductor and the second conductor.

8 Claims, 9 Drawing Sheets

COIL DEVICE AND ELECTRONIC CIRCUIT

TECHNICAL FIELD

The invention relates to a coil device and an electronic circuit.

BACKGROUND

The coil device described in Patent Document 1 can achieve a high magnetic coupling between conductors, and is suitably used as a coupling inductor for power supply circuits and the like. Power supply circuits using such coupling inductors are required to be further miniaturized.

[Patent Document 1] Japanese Unexamined Patent Publication 2022-33703

SUMMARY

The invention has been made considering the above circumstances, and an object of the invention is to provide a coil device and an electronic circuit that can realize miniaturization of the device.

To achieve the above object, the coil device of the invention includes:

a first conductor;

a second conductor located inside the first conductor;

a first inner core located inside the second conductor; and a second inner core located between the first conductor and the second conductor.

An electronic circuit of the invention includes the coil device.

DETAILED DESCRIPTION

Embodiments of the invention will be described with reference to the drawings. Although the description will be made with reference to the drawings as necessary, the illustrated contents are only schematically and exemplarily shown for understanding of the invention. Thus, the appearance, dimensional ratio, etc. may differ from the actual product. Hereinafter, the invention will be specifically described based on the embodiments, but the invention is not limited thereto.

First Embodiment

Figure 1A:
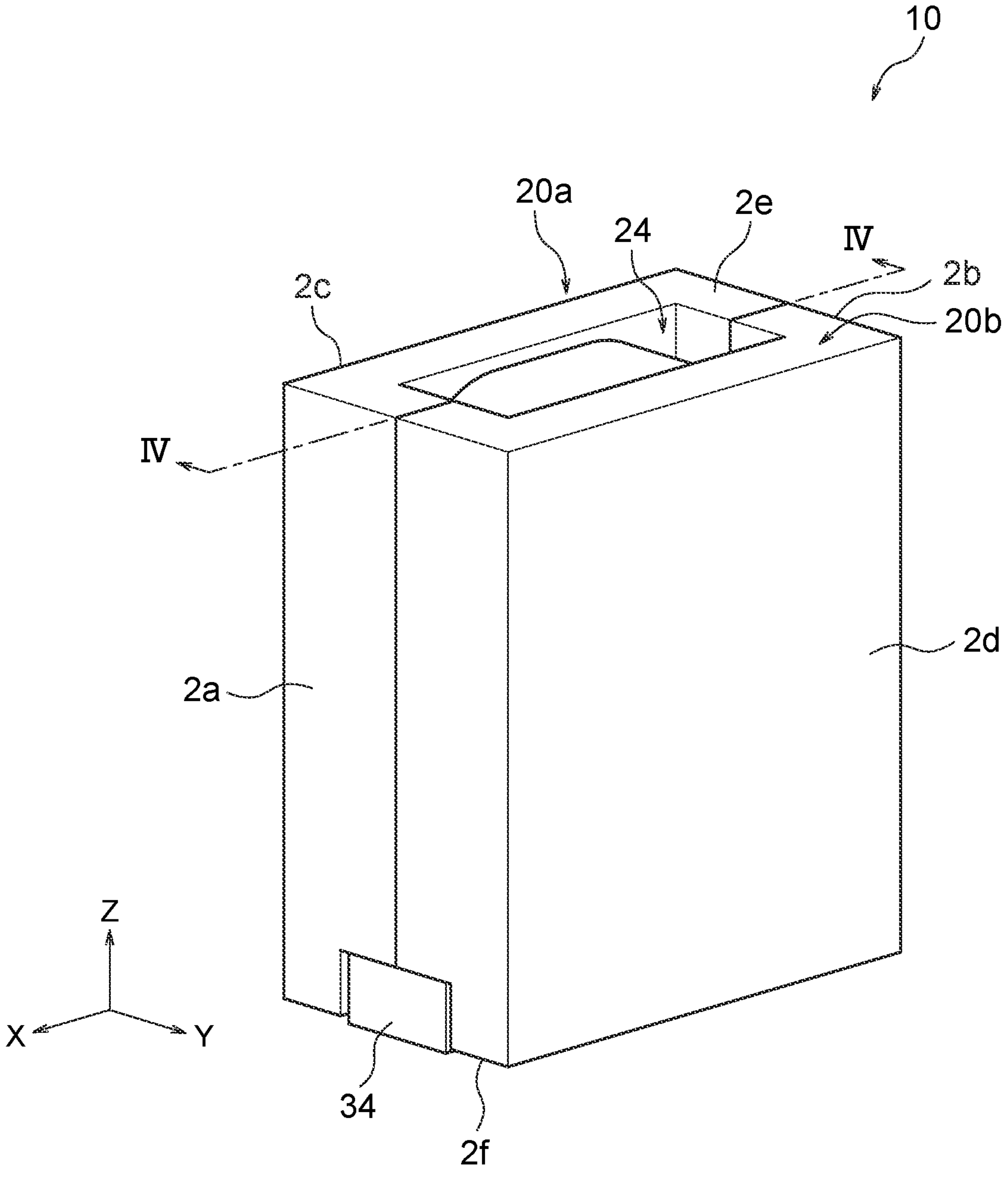
FIG. 1A is a perspective view of the coil device according to an embodiment.

As shown in FIG. 1A, the coil device 10 according to this embodiment has substantially a rectangular parallelepiped profile, including a first surface 2*a*, a second surface 2*b*, a third surface 2*c*, a fourth surface 2*d*, a fifth surface 2*e*, and a sixth surface 2*f*, but the shape is not particularly limited. The first surface 2*a* and the second surface 2*b* face each other in the X-axis direction, the third surface 2*c* and the fourth surface 2*d* face each other in the Y-axis direction, and the fifth surface 2*e* and the sixth surface 2*f* face each other in the Z-axis direction. In the drawings, the X-axis direction, the Y-axis direction, and the Z-axis direction are orthogonal to each other.

Although the dimensions of the coil device 10 are not particularly limited, the width in the X-axis direction may be 9.0 to 12.0 mm, the width in the Y-axis direction may be 4.0 to 6.0 mm, and the height in the Z-axis direction may be 3.0 to 20.0 mm.

Figure 2:
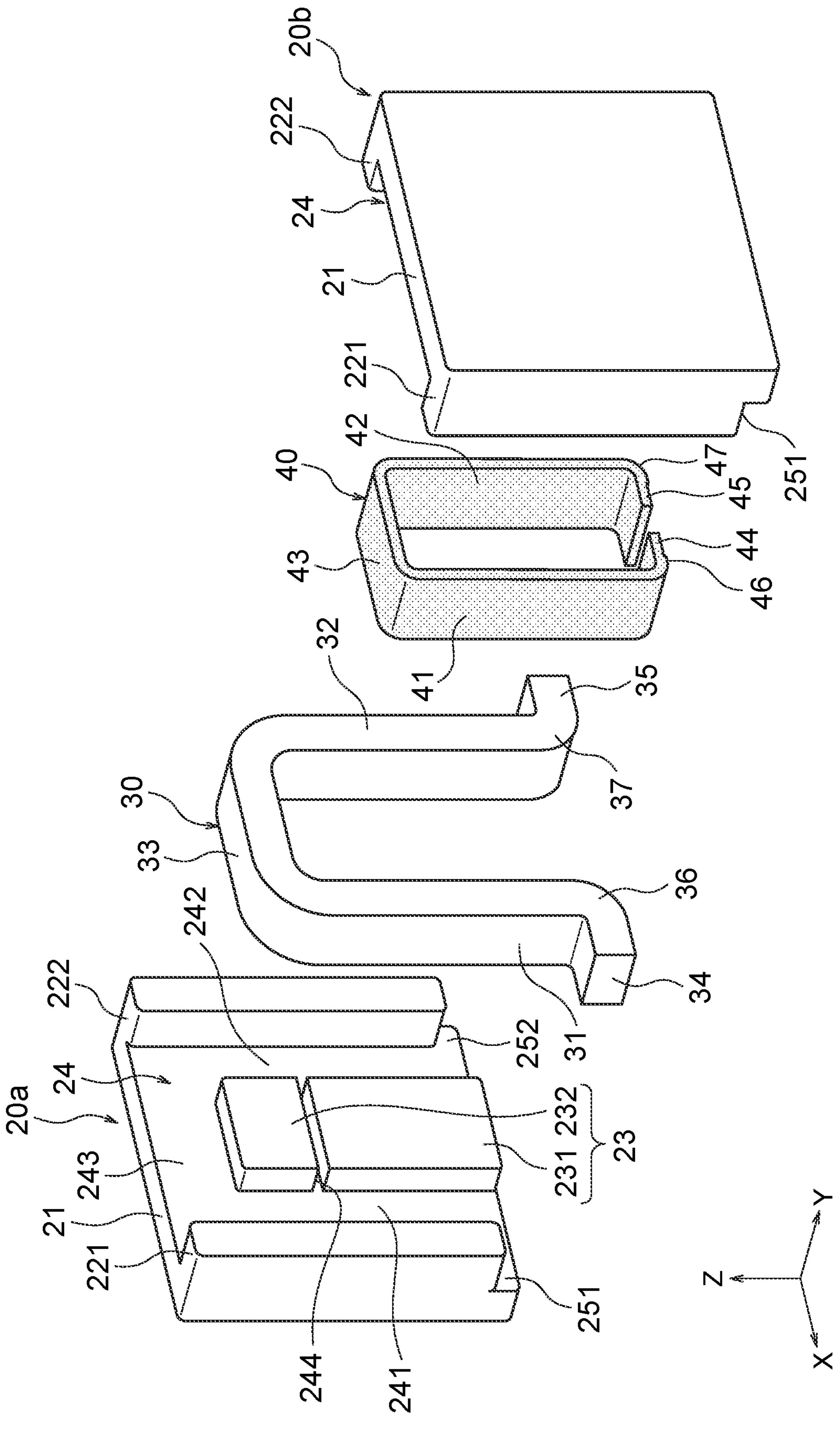
FIG. 2 is a disassembled perspective view of the coil device shown in FIG. 1A.

As shown in FIG. 2, the coil device 10 include magnetic cores 20*a* and 20*b*, a first conductor 30 and a second conductor 40. One of the first conductor 30 and the second conductor 40 functions as a primary coil, and the other functions as a secondary coil. Details of the conductors 30 and 40 will be described below.

Figure 1B:
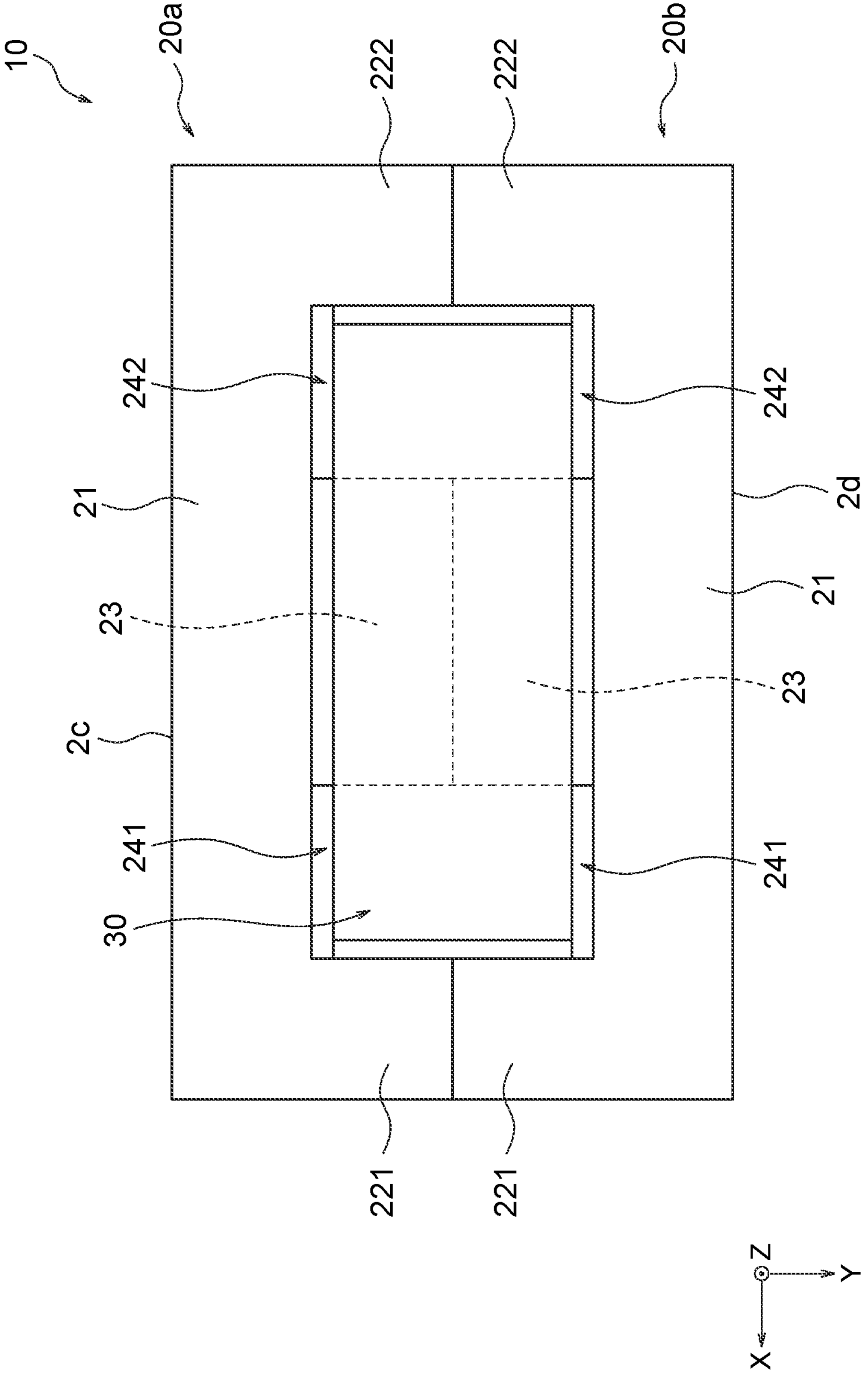
FIG. 1B is a plan view of the coil device shown in FIG. 1A

As shown in FIG. 1A, in an exemplary embodiment, the magnetic cores 20*a*, 20*b* are combined to form the first surface 2*a*, the second surface 2*b*, the third surface 2*c*, the fourth surface 2*d*, a fifth surface 2*e*, and a sixth surface 2*f* of the coil device 10. As shown in FIG. 1B, the magnetic cores 20*a* and 20*b* are what is called E-shaped and have the same shape, but the shapes are not limited thereto. For example, one magnetic core may be E-shaped and the other magnetic core may be I-shaped.

The magnetic cores 20*a* and 20*b* are located to face each other in the Y-axis direction. The magnetic cores 20*a* and 20*b* may be joined together using an adhesive or the like. The magnetic cores 20*a* and 20*b* include magnetic material, and may be produced by pressing and sintering such as Ni—Zn ferrite, Mn—Zn ferrite, or magnetic powder including a magnetic material with relatively high magnetic permeability such as a metal magnetic material.

As shown in FIG. 2, the magnetic cores 20*a* and 20*b* respectively have a base 21, outer legs 221 and 222, inner core 23 located between the outer legs 221 and 222 along the X axis, a groove 24, a first side groove 251 and a second side groove 252. The base 21 has a substantially flat plate shape or substantially rectangular parallel piped shape. Although the magnetic core 20*a* is mainly described below, the description also applies to the magnetic core 20*b*.

As shown in FIG. 2, the outer legs 221 and 222 are respectively located at the ends of the base 21 on one side and on the other side in the X-axis direction so as to be separated from each other in the X-axis direction. The outer legs 221 and 222 each protrude from the base 21 toward the other base 21 on the other side in the Y-axis direction. The outer legs 221 and 222 each have an elongated shape in the Z-axis direction and extend from the upper end to the lower end of the base 21 in the Z-axis direction.

As shown in FIG. 2, the inner core 23 has a first inner core 231 and a second inner core 232. In addition, the first inner core 231 and the second inner core 232 each protrude from one side of the base 21 toward the other base 21 on the other side in the Y-axis direction.

As shown in FIG. 2, the first inner core 231 is formed at substantially the center of the base 21 in the X-axis direction. The first inner core 231 is located below the base 21 in the Z-axis direction. The second inner core 232 is located above the first inner core 231 in the Z-axis direction, and spaced apart from the first inner core 231. The protrusion widths of the first inner core 231 and the second inner core 232 in the Y-axis direction are substantially equal to the protrusion widths of the outer legs 221 and 222 in the Y-axis direction. In the exemplary embodiment, along the X-axis direction, the widths of the first inner core 231 and the second inner core 232 are approximately two to three times greater than the widths of the outer legs 221 and 222.

As shown in FIG. 2, the groove 24 is formed between outer legs 221 and 222. The groove 24 include a first side part 241, a second side part 242, an upper part 243 and an intermediate part 244. The first side part 241 and the second side part 242 each extend substantially linearly along the Z-axis direction, and extend from the upper end to the lower end of the base 21 in the Z-axis direction.

As shown in FIG. 2, the first side part 241 is formed between the outer leg 221 located on one side in the X-axis direction and the inner core 23. Also, the second side part 242 is formed between the outer leg 222 located on the other side in the X-axis direction and the inner core 23. The width of each of the first side part 241 and the second side part 242 in the X-axis direction is larger than the sum of the thicknesses, the plate thicknesses, of the conductors 30 and 40.

As shown in FIG. 2, the upper part 243 is formed above the base 21 and extends along the X-axis direction. The upper part 243 connects the upper end of the first side part 241 and the upper end of the second side part 242. The width of the upper part 243 in the Z-axis direction is larger than the thickness, the plate thickness, of the conductor 30.

As shown in FIG. 2, the intermediate part 244 is formed between the first inner core 231 and the second inner core 232 and extends along the X-axis direction. The intermediate part 244 connects the middle part of the first side part 241 and the middle part of the second side part 242. The width of the intermediate part 244 in Z-axis direction is larger than the thickness, the plate thickness, of the conductor 40.

As shown in FIG. 2, the first side groove 251 is formed below the outer leg 221 located on one side of base 21 in the X-axis direction. The first side groove 251 extends toward one side of the base 21 along the X-axis direction. The second side groove 252 is formed below the outer leg 222 located on the other side of the base 21 in the X-axis direction. The second side groove 252 extends toward the other side of the base 21 along the X-axis direction. The side grooves 251 and 252 are connected to the lower ends of the side p arts 241 and 242, respectively, and the side parts 241 and 242 and the side grooves 251 and 252 form a substantially L-shaped groove. The width of each of the side grooves 251 and 252 in the Z-axis direction is approximately the same or larger as the thickness, the plate thickness, of the first conductor 30.

As shown in FIG. 1B, the combination of the magnetic cores 20*a* and 20*b* is possible by joining one surface of the magnetic core 20*a*, located on the side opposite to the third surface 2*c* in the Y-axis direction, and the other surface of the magnetic core 20*b*, located on the side opposite to the fourth surface 2*d* in the Y-axis direction, via such as an adhesive (not shown). More specifically, according to the magnetic cores 20*a* and 20*b*, the outer legs 221 and 222, the first inner cores 231 and 231, and the second inner cores 232 and 232 are mutually adhered. The outer legs 221 and 222, the first inner cores 231, 231 and the second inner cores 232, 232 may not all be adhered, and a gap may be formed in one or both of them.

As shown in FIG. 2, in the exemplary embodiment, the first conductor 30 is formed by a conductor plate and has a curved shape, a substantially U-shape. As shown in FIG. 1B, the first conductor 30 and the second conductor 40 are located between the magnetic cores 20*a* and 20*b*. Examples of the material comprising the first conductor 30 include good metal conductors such as copper, copper alloys, silver, and nickel, but are not particularly limited as long as they are conductive materials. The first conductor 30 is formed by such as machining a metal plate, but the method for forming the first conductor 30 is not limited thereto. Note that the first conductor 30 is not limited to a conductor plate, and may be a rectangular wire.

Figure 4:
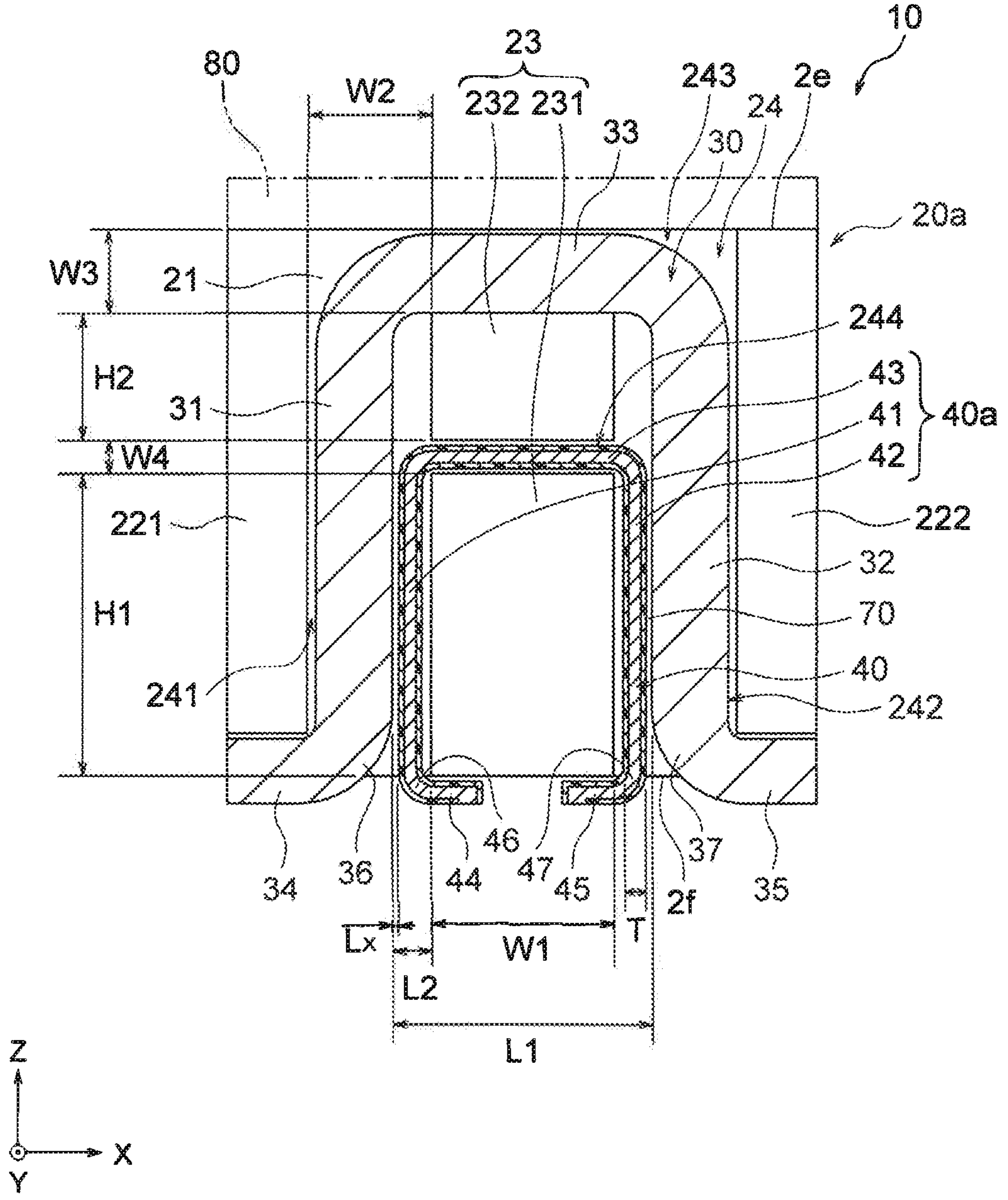
FIG. 4 is a cross-sectional view along line IV-IV shown in FIG. 1A.

As shown in FIG. 4, in the exemplary embodiment, the first conductor 30 has a longitudinally elongated shape as a whole, having its height in the Z-axis direction greater than its width in the X-axis direction. In the exemplary embodiment, the cross-sectional area perpendicular to the extending direction of the first conductors 30 is larger than the cross-sectional area perpendicular to the extending direction of the second conductors 40. Also, in the exemplary embodiment, the thickness (the plate thickness) of the first conductor 30 is greater than the thickness (the plate thickness) of the second conductor 40. The thickness of the first conductor 30 may be 0.5 to 2.5 mm, and the thickness of the second conductor 40 may be 0.1 to 1 mm. The width of the first conductor 30 in the Y-axis direction may be substantially equal to the width of the second conductor 40 in the Y-axis direction.

A plated layer may be formed on the entire surface of the first conductor 30. The plated layer may be a single layer or multiple layers. The plated layer may include a metal plated layer such as Cu plating, Ni plating, Sn plating, Ni—Sn plating, Cu—Ni—Sn plating, Ni—Au plating, and Au plating. The plated layer can be formed on the surface of the first conductor 30 by such as electroplating or electroless plating. Although the thickness of the plated layer is not particularly limited, it may be 1 to 30 μm.

As shown in FIG. 2, in the exemplary embodiment, the first conductor 30 includes a first conductor side 31, a second conductor side 32, a conductor top 33, a first mounting part 34, and a second mounting part 35. The conductor top 33 is located at the top of the first conductor 30 in the Z-axis direction and extends along the X-axis direction. The first conductor side 31 is connected to one end of the conductor top 33 in the X-axis direction, and the second conductor side 32 is connected to the other end of the conductor top 33 in the X-axis direction. The first conductor side 31 and the second conductor side 32 each extend along the Z-axis direction.

The first mounting part 34 and the second mounting part 35 are formed by integrally connecting to an end and the other end of the first conductor 30, respectively. The end and the other end of the first conductor 30 are the lower ends of the first conductor side 31 and the second conductor side 32. The mounting parts 34 and 35 are bent with respect to the conductor sides 31 and 32 and extend outward in the X-axis direction. It is possible to connect the first conductor 30 to the electronic circuit 100 (see FIG. 7) or the like through these mounting parts 34 and 35. The connection of the first conductor 30 to the electronic circuit can be performed via an adhering member such as solder or conductive adhesive.

In the vicinity of the boundary between the first conductor side 31 and the first mounting part 34, a first outer bent part 36, that bends outward in the X-axis direction toward a side opposite to the side on which the second conductor 40 is located, is formed. In the vicinity of the boundary between the second conductor side part 32 and the second mounting part 35, a second outer bent part 37 that bends outward in the X-axis direction is formed.

As shown in FIG. 2, in the exemplary embodiment, the second conductor 40 includes conductor plate and has a curved shape, a substantially U-shape. As shown in FIG. 1B, the second conductors 40 may include the same material as the first conductors 30. The second conductor 40 and the first conductor 30 are located between the magnetic cores 20*a* and 20*b*. In addition, the second conductor 40 is not limited to a conductor plate, and may be a rectangular wire.

As shown in FIG. 4, in the exemplary embodiment, the second conductor 40 has a longitudinally elongated shape, having its height in the Z-axis direction greater than its width in the X-axis direction. The second conductor 40 is smaller than the first conductor 30. The second conductor 40 is placed inside the first conductor 30, between the first conductor side 32 and the second conductor side 32 and below the conductor top 33 in the Z-axis direction.

As shown in FIG. 2, in the exemplary embodiment, the second conductor 40 includes an extension 40*a* extending along the first conductor 30, a first mounting part 44, and a second mounting part 45. The extension 40*a* has a conductor top 43, a first conductor side 41 and a second conductor side 42. The conductor top 43 is located at the top of the second conductor 40 in the Z-axis direction and extends along the X-axis direction away from the first conductor 30. The first conductor side 41 is connected to one end of the conductor top 43 in the X-axis direction, and the second conductor side 42 is connected to the other end of the conductor top 43 in the X-axis direction. The first conductor side 41 and the second conductor side 42 each extend along the Z-axis direction closer to the first conductor 30.

As shown in FIG. 4, in the exemplary embodiment, the first conductor side 41 of the second conductor 40 is located opposite to the first conductor side 31 of the first conductor 30, with an interval Lx therebetween. The second conductor side 42 of the second conductor 40 is located opposite to the second conductor side 32 of the first conductor 30. The conductor top 43 is located to face the conductor top 33 of the first conductor 30.

The first mounting part 44 and the second mounting part 45 are formed by integrally connected to an end and the other end of the first conductor 40, respectively. The end and the other end of the first conductor 40 are the lower ends of the first conductor side 41 and the second conductor side 42.

The mounting parts 44 and 45 are bent with respect to the conductor sides 41 and 42, and extend outward in the X-axis direction. As shown in FIG. 4, the mounting parts 44 and 45 extend along the bottom surface of the first inner core 231, and the top surfaces of the mounting parts 44 and 45 are provided apart from the bottom surface of the first inner core 231 in the Z-axis direction.

The extending direction of the first mounting part 44 of the second conductor 40 is opposite to the extending direction of the first mounting part 34 of the first conductor 30 with respect to the X-axis direction. The extending direction of the second mounting part 45 of the second conductor 40 is opposite to the extending direction of the second mounting part 35 of the first conductor 30 with respect to the X-axis direction.

The second conductor 40 can be connected to such as the electronic circuit 100 (see FIG. 7) via these mounting parts 44 and 45. The connection of the second conductor 40 to the electronic circuit can be performed via an adhering member such as solder or conductive adhesive.

As shown in FIG. 4, the second conductor 40 may have an insulating layer 70 that covers its surface, except for the parts where the mounting parts 44 and 45 are connected to electronic circuits and the like. In an exemplary embodiment, the insulating layer 70 is formed by an insulating coating and is integrally provided with the second conductor 40. The outer surface of the insulating layer 70 is not in contact with the inner surface of the first conductor 30, and the outer surface of the insulating layer 70 of the second conductor 40 is spaced apart from the inner surface of the first conductor 30.

The material included in the insulating layer 70 is not particularly limited, but examples thereof include polyester, polyesteramide, polyamide, polyamideimide, polyurethane, epoxy, and epoxy-modified acrylic resin.

As shown in FIG. 4, the first conductor side 31 of the first conductor 30 and the first conductor side 41 of the second conductor 40 are located in the first side part 241 of the groove 24. The second conductor side 32 of the first conductor 30 and the second conductor side 42 of the second conductor 40 are provided in the second side 242 of the groove 24. A conductor top 33 of the first conductor 30 is provided in the upper part 243 of the groove 24. A width W3 of the upper part 243 in the Z-axis direction is not particularly limited. The width W3 may be designed such that the upper surface of the conductor top 33 is located below or flush with the fifth surface 2*e* when the conductor top 33 is located in the upper part 243.

The conductor top 43 of conductor 40 is provided in the intermediate part 244. Although the width W4 of the intermediate part 244 in the Z-axis direction is not particularly limited, the width W4 may be designed such that the conductor top 33 is preferably provided apart from or in contact with the first inner core 232 and the second inner core in the Z-axis direction, when the conductor top 33 is provided in the intermediate part 244. For example, the width W4 is preferably around one to two times the thickness T of the conductor 40.

As shown in FIG. 4, the second conductor 40 and the first inner core 231 are located between the first conductor side 31 and the second conductor side 32. A separated distance L1 between the first conductor side 31 and the second conductor side 32 in the X-axis direction is not particularly limited. Although a separated distance L2 between the first conductor side 31 and the first inner core 231 in the X-axis direction is also not particularly limited, the separated distance L2 may be designed such that the first conductor side 41 is preferably provided apart from or in contact with the first conductor side 31 and the first inner core 231 in the Z-axis direction, when the first conductor side 41 is provided between the first conductor side 32 and the first inner core 23. For example, the separated distance L2 is preferably around one to two times the thickness T of the conductor 40. Note that a separated distance in the X-axis direction between the first conductor side 32 and the first inner core 232 may be the same as the separated distance L2.

The first conductor side 31 of the first conductor 30 and the first conductor side 41 of the second conductor 40 are located in the first side part 241. The width W2 of the first side part 241 in the X-axis direction is not particularly limited. In addition, the width W2 may be designed such that the first conductor side 31 of the first conductor 30 is preferably provided apart from or in contact with the outer leg 221 and the first conductor side 41 of the second conductor 40. Also, the width W2 may be designed such that the first conductor side 41 of the second conductor 40 is preferably provided apart from or in contact with the first inner core 231 in the X-axis direction. Also, the width of the second side part 242 in the X-axis direction may be the same as the width W2 of the first side part 241 in the X-axis direction.

The first inner core 231 and the second inner core 232 are located between the first conductor side 41 and the second conductor side 42 of the second conductor 40 in the X-axis direction. The first inner core 231 is located between the conductor top 43 and the mounting parts 44 and 45 of the second conductor 40 in the Z-axis direction. The second inner core 232 is provided between the conductor top 33 of the first conductor 30 and the conductor top 43 of the second conductor 40 in the Z-axis direction.

The height H1 of the first inner core 231 in the Z-axis direction and the height H2 of the second inner core 232 in the Z-axis direction are not particularly limited. For example, the heights H1 and H2 are preferably designed such that the cross-sectional area ratio S1/(S1+S2) is to be 0.5 or more and less than 1 when the cross-sectional area of the first inner core 231 in the Y-axis direction is S1 and the cross-sectional area of the second inner core 232 in the Y-axis direction is S2. Moreover, preferably, the heights H1 and H2 may be designed such that the cross-sectional area ratio S1/(S1+S2) is 0.7 or more and less than 0.95.

As shown in FIG. 4, the mounting parts 34 and 35 of the first conductor 30 are provided in the side grooves 251 and 252, respectively. Ends or end faces of the mounting parts 34 and 35 are exposed to the outside from the sides of the magnetic cores 20*a* and 20*b* in the X-axis direction. The lower surfaces of the mounting parts 34 and 35 are exposed to the outside below the magnetic core 20*a*, the sixth surface 2*f*. The lower surfaces of the mounting parts 44 and 45 are exposed to the outside below the magnetic core 20*a*, the sixth surface 2*f*.

As shown in FIG. 4, according to the coil device 10 of the embodiment, the cross-sectional area ratio S1/(S1+S2) can be easily changed and the coupling coefficient K can be easily adjusted by changing the ratio between the height H1 of the first inner core 231 and the height H2 of the second inner core 232.

Figure 7:
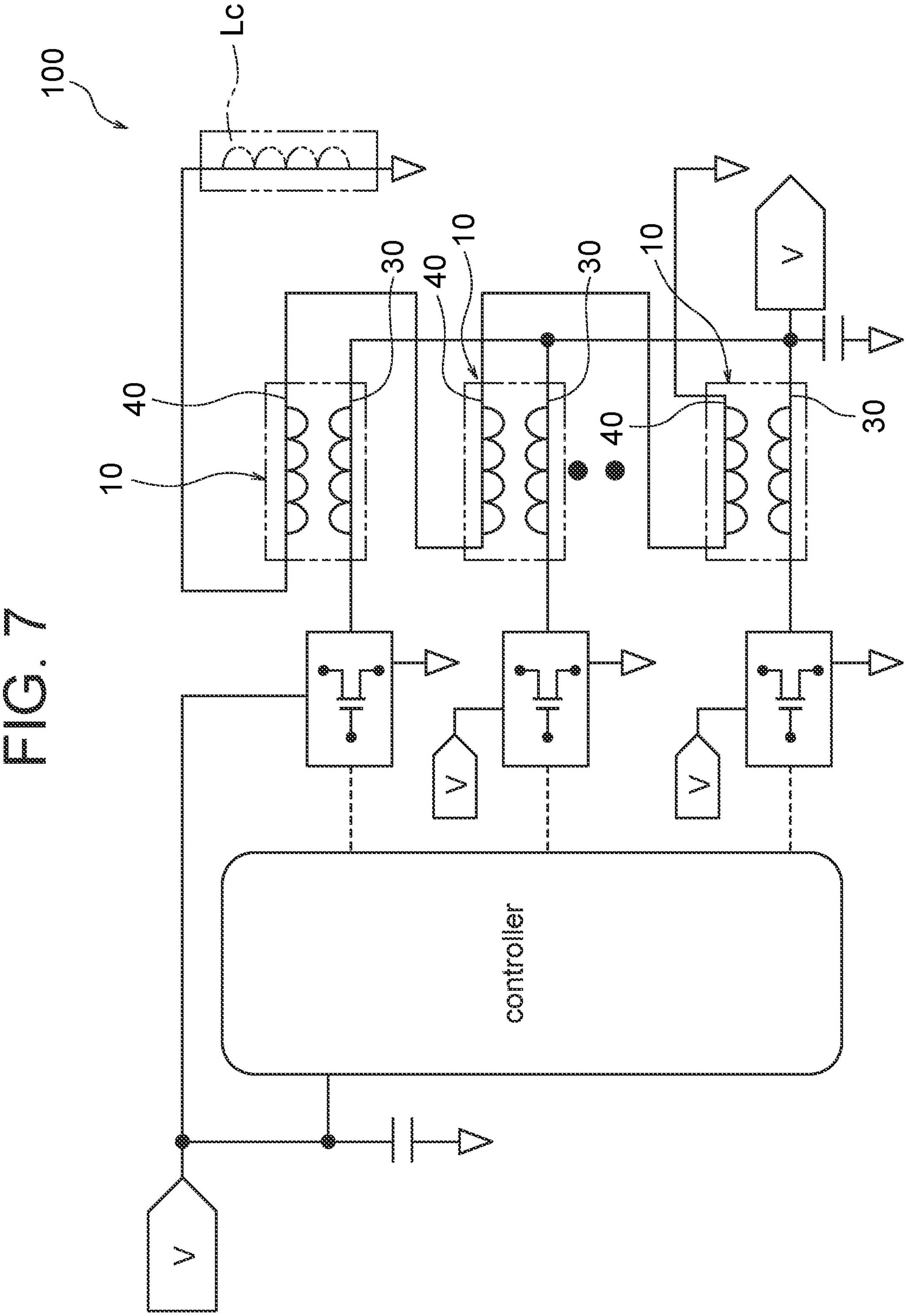
FIG. 7 is a circuit diagram illustrating an electronic circuit of an embodiment.

Coil device 10 may be used in electronic circuits such as a trans-inductor voltage regulator (TLVR) circuit as shown in FIG. 7. The coil device 10 shown in FIG. 7 can function as a coupling inductor in the TLVR circuit. The TLVR circuit having the coil device 10 can improve the response speed of the server. According to the TLVR circuit shown in FIG. 7, coil devices 10 are connected in series, but the invention is not limited thereto.

According to the conventional TLVR circuit, the desired inductance was provided by separately attaching the inductor Lc in addition to the coupling inductor. According to the TLVR circuit shown in FIG. 7, a desired inductance can be provided by attaching the coil device 10 of the embodiment, in which the coupling coefficient K is adjusted to a predetermined value, as the coupling inductor. Therefore, according to the TLVR circuit shown in FIG. 7, there is no need to separately attach an inductor Lc for adjustment, and the size of the device can be reduced.

Hereinafter, exemplary embodiments are described. According to the exemplary embodiments, in the first conductor 30 shown in FIG. 4, the side on which the first conductor side 31 is provided functions as an input terminal (or an output terminal), while the side on which the second conductor side 32 is provided functions as an output terminal (or an input terminal). In the second conductor 40, the side on which the second conductor side 41 is provided functions as an input terminal (or an output terminal), while the side on which the second conductor side 42 is provided functions as an output terminal (or an input terminal).

In the exemplary embodiments, the second conductor 40 includes the extension 40*a*, which extends along the first conductor 30. In addition, the extension 40*a* includes a first part, which is the conductor top 43 extending away from the first conductor 30, and a second part, which is the first conductor side 41 and the second conductor side 42 extending closer to the first conductor 30. The second inner core 232 is located between the conductor top 43 and the first conductor 30. By placing each part in this way, the coil device 10 can be miniaturized while adjusting the coupling coefficient of the coil device 10.

According to the exemplary embodiment, the mounting parts 44 and 45 of the second conductor 40 are provided below the first inner core 231 in the Z-axis direction. The first inner core 231 is located inside the extension 40*a* and the mounting parts 44 and 45. An insulating layer 70 including an insulating coating is integrally formed on the second conductor 40. The surface or the outer surface of the insulating layer 70 is not in contact with the inner surface of the first conductor 30, so that the outer surface of the insulating layer 70 according to the second conductor 40 is placed apart from the inner surface of the first conductor 30. In the exemplary embodiment, the second conductor 40 is well insulated from the first conductor 30 and the magnetic cores 20*a* and 20*b*. Also, an insulation coating layer such as epoxy resin or urethane resin may be formed on the bottom surface of the first inner core 231 in the Z axis direction. The insulation between the first inner core 231 and the mounting parts 44 and 45 improves when the insulating coating layer is formed on the bottom surface of the first inner core 231.

According to the exemplary embodiment, the magnetic cores 20*a* and 20*b* may form a closed magnetic circuit with the base 21, the outer legs 221 and 222, the first inner core 231 and the second inner core 232. Properties of the coil device 10 can be improved by the magnetic core forming a closed magnetic circuit.

According to the exemplary embodiment, the first inner core 231 and the second inner core 232 may comprise the same magnetic material. When the first inner core 231 and the second inner core 232 comprise the same material, the first inner core 231 and the second inner core 232 can be integrally formed as a part of the magnetic core 20*a* or 20*b*, which facilitates the production of the coil device 10.

According to the exemplary embodiment, the first inner core 231 and the second inner core 232 may comprise different magnetic materials. The coupling coefficient of the coil device can also be easily adjusted by changing the magnetic materials of the first inner core 231 and the second inner core 232. For example, the second inner core 232 may a material having a lower magnetic permeability than that of the first inner core 231. By comprising the second inner core 232 with a material having a lower magnetic permeability than that of the first inner core 231, the coupling coefficient of the coil device can be adjusted without changing the cross-sectional area ratio S1/(S1+S2).

As shown in FIG. 4, the coil device 10 may further include an I core 80 so as to cover the groove 24 above the fifth surface 2*e* in the Z-axis direction. The I-core 80 may be attached to the coil device 10 with an adhesive or the like. The coil device 10 can also adjust the coupling coefficient by attaching the I core 80. Also, an identifier such as a serial number can be printed on the I core. The same material as the magnetic cores 20*a* and 20*b* can be used for producing the I core.

For the production of the coil device 10, the magnetic cores 20*a* and 20*b*, the first conductor 30, and the second conductor 40 shown in FIG. 2 are prepared. As the second conductor 40, for example, a conductor plate, having an insulating coating (insulating layer 70) on its surface and machined into the shape shown in FIG. 2, is prepared. Such conductor plate with an insulating coating can be formed by such as immersing a metal plate material in a resin liquid.

Figure 3:
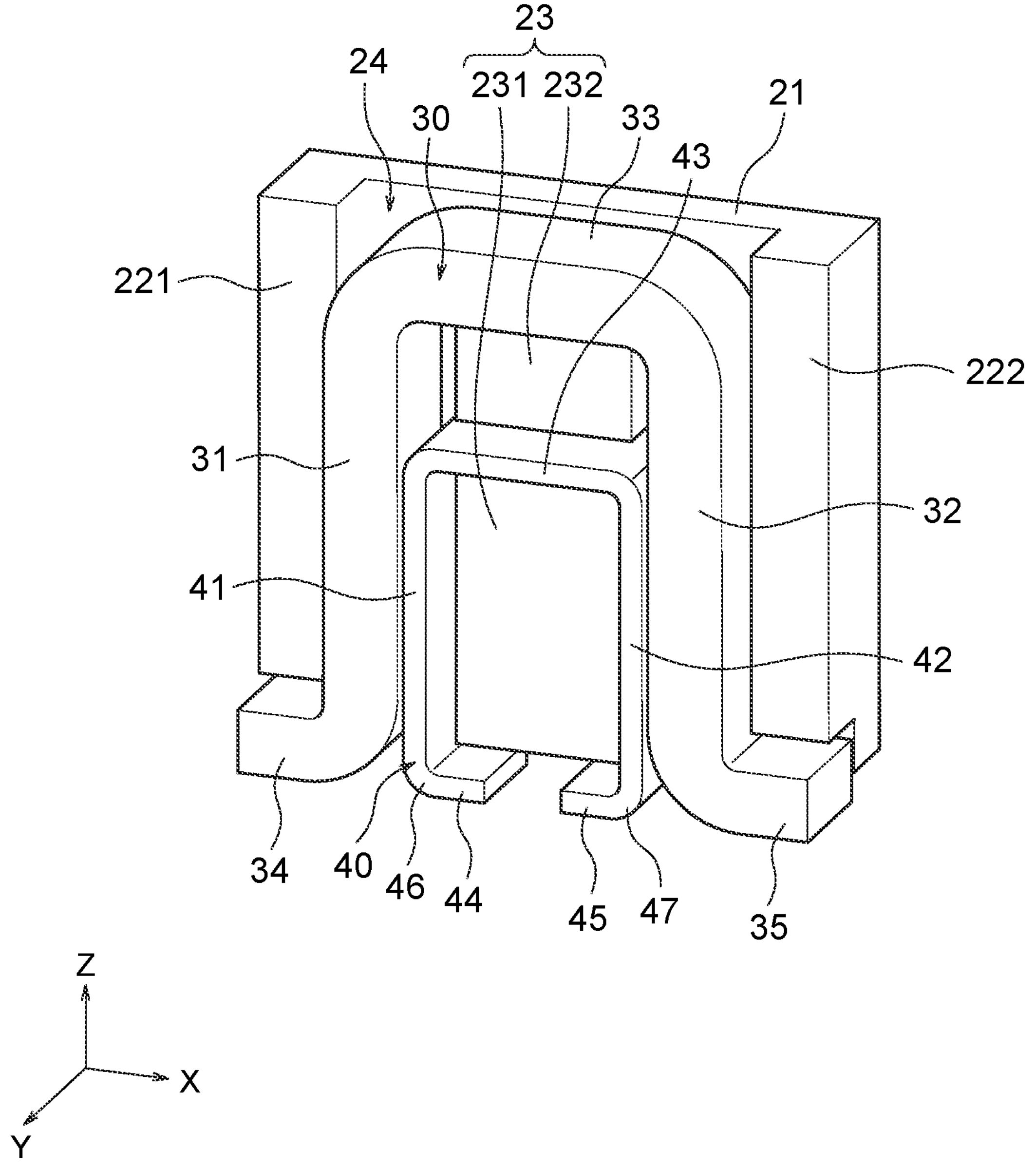
FIG. 3 is a perspective view of a part of the coil device shown in FIG. 1A.

Next, the first conductor 30 and the second conductor 40 are combined with the magnetic core 20*a*. As shown in FIG. 3, the first conductor 30 and the second conductor 40 are placed inside the groove 24 of the magnetic core 20*a*. More specifically, the second conductor 40 is provided so as to surround the first inner core 231, and then the first conductors 30 is provided so as to surround the first conductor side 41 and the second conductor side 42 of the second conductor 40 and the second inner core 40 at predetermined intervals. The first conductor 30 and/or the second conductor 40 may be fixed to the magnetic core 20*a* with an adhesive or the like.

Next, the magnetic core 20*a* and the magnetic core 20*b* are combined so that the first conductor 30 and the second conductor 40 are accommodated inside the groove 24 of the magnetic core 20*b*.

As shown in FIG. 1B, the end face of the inner core 23 of the magnetic core 20*a* abuts against the end face of the inner core 23 of the magnetic core 20*b*. The end faces of the outer legs 221 and 222 of the magnetic core 20*a* abut against the end faces of the outer legs 221 and 222 of the magnetic core 20*b*. The coil device 10 shown in FIG. 1A is obtained by adhering the magnetic cores 20 and 20*b* with an adhesive or the like. As shown in FIG. 4, when the I core 80 is further attached, it is adhered to the fifth surface 2*e* using an adhesive or the like.

Second Embodiment

A coil device 10*a* of the embodiment is the same as the coil device 10 of the first embodiment except for the followings. Hereinafter, the description of the parts common to the first embodiment will be omitted, and the different parts will mainly be described in detail.

Figure 5:
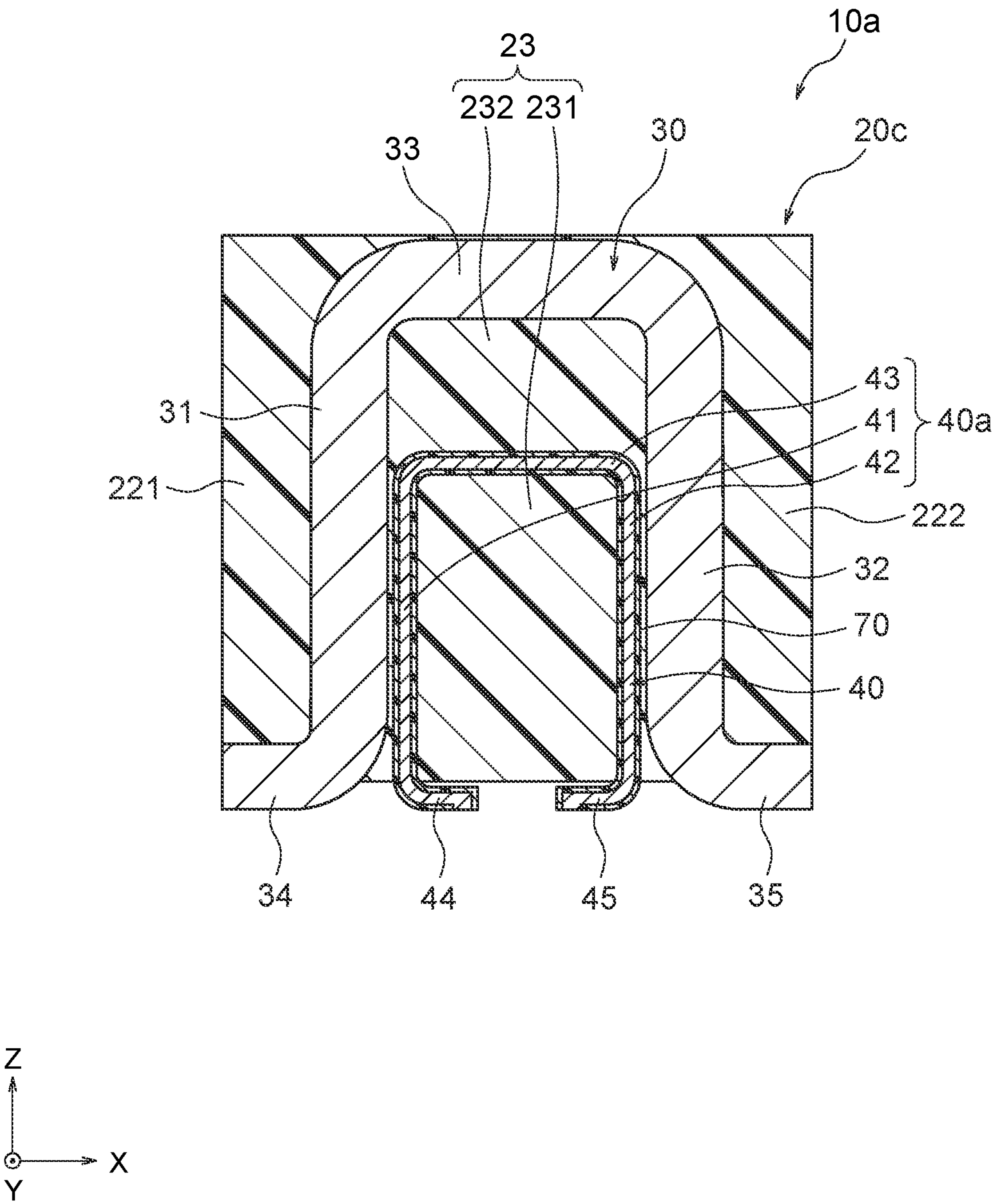
FIG. 5 is a cross-sectional view according to another embodiment.

A cross-sectional view of the coil device 10*a* is shown in FIG. 5. In this embodiment, the magnetic core 20*c* comprises a molding material including a magnetic material and a resin material.

The magnetic material used for the molding material is not particularly limited, and examples thereof include ferrite or metal magnetic material. Ferrite include Ni—Zn ferrite, Mn—Zn ferrite, and the like, but it is not limited thereto. Metal magnetic materials is not particularly limited, and examples thereof include Fe—Ni alloys, Fe—Si alloys, Fe—Si—Cr alloys, Fe—Co alloys, and Fe—Si—Al alloys. The resin material used for the molding material is not particularly limited, and examples thereof include epoxy resin, phenol resin, polyester resin, polyurethane resin, polyimide resin, other synthetic resins, and other non-magnetic materials.

The following method may be used to produce the coil device 10*a* of the embodiment. A molding material including a magnetic material and a resin material, a press mold used for pressing the magnetic core 20*c*, and the first conductor 30 and the second conductor 40 shown in FIG. 2 are prepared. The coil device 10*a* can be obtained by filling the molding material in a press mold for pressing to obtain the magnetic core and placing the first conductor 30 and the second conductor 40 at predetermined positions, and then compressing the mold material by a known method to form the magnetic body 20*c*. Injection molding or the like may be used for pressing the magnetic core 20.

As shown in FIG. 5, according to the exemplary embodiment, the magnetic core 20*c* including the first inner core 231 and the second inner core 232 comprise the molding material including a magnetic material and a resin material. The first inner core 231 and the second inner core 232 comprising the molding material are in close contact with the first conductor 30 and the second conductor 40. The coupling coefficient of the coil device can also be adjusted by forming the first inner core 231 and the second inner core 232 by the molding material.

Third Embodiment

A coil device 10*b* of the embodiment is the same as the coil device 10 of the first embodiment except for the followings. Hereinafter, the description of the parts common to the first embodiment will be omitted, and the different parts will mainly be described in detail.

Figure 6:
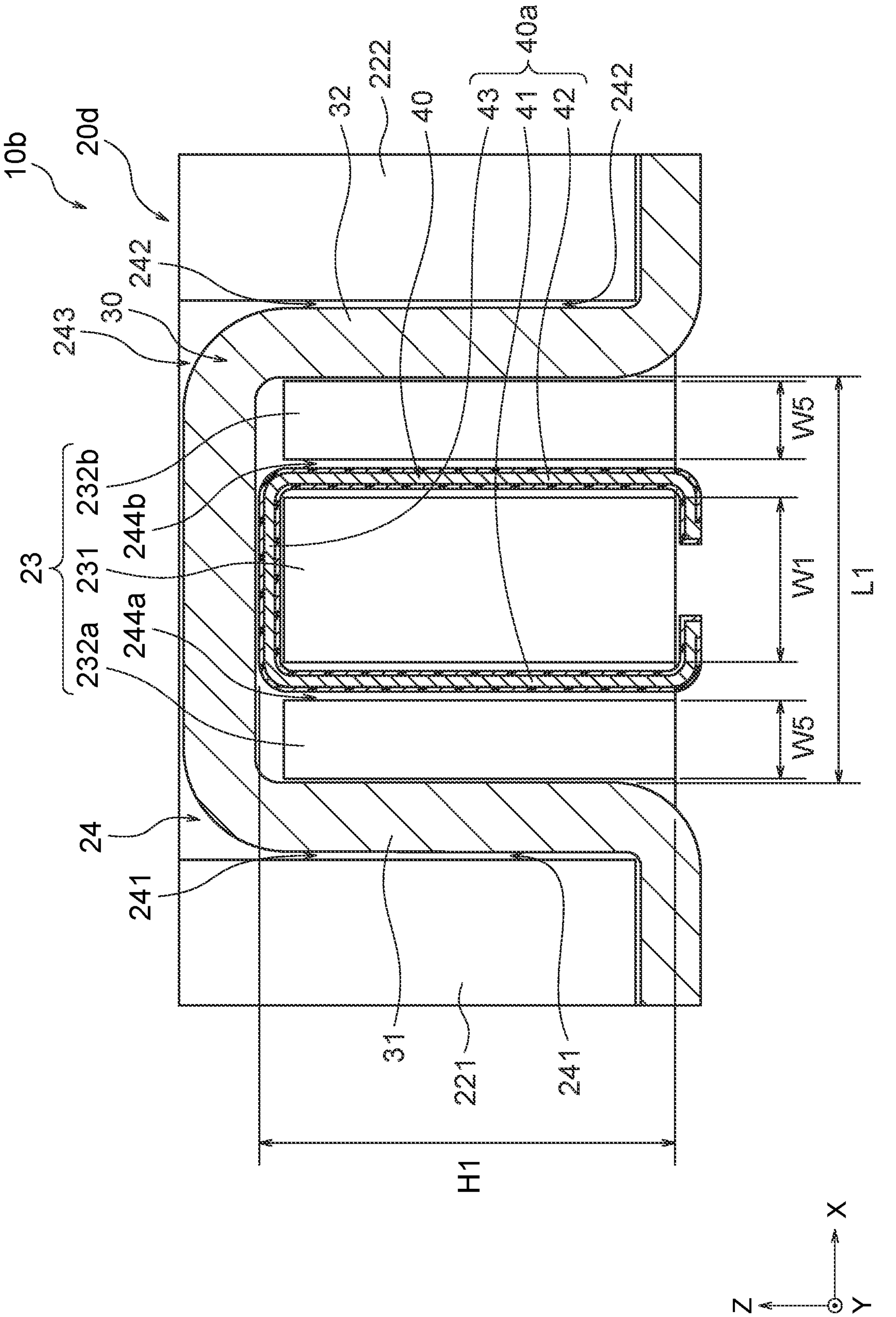
FIG. 6 is a cross-sectional view according to still another embodiment.

A coil device 10*b* of the embodiment has a magnetic core 20*d* shown in FIG. 6. The coil device 10*b* further has a similarly shaped magnetic core that is attached to the magnetic core 20*d*, and has a substantially rectangular parallelepiped outer shape.

The inner core 23 of the magnetic core 20*d* has the first inner core 231 and second inner cores 232*a* and 232*b*. The second inner cores 232*a* and 232*b* are respectively located apart from the first inner core 231 and the outer legs 221 and 222 in the X-axis direction.

As shown in FIG. 6, the second inner core 232*a* is located between the first inner core 231 and the outer leg 221. The second inner core 232*b* is located between the first inner core 231 and the outer leg 222. The first inner core 231 is provided between the second inner cores 232*a* and 232*b*. The widths of the second inner cores 232*a* and 232*b* in the X-axis direction may be different.

As shown in FIG. 6, in the magnetic core 20*d*, the groove 24 includes the first side part 241, the second side part 242, the upper part 243, a first intermediate part 244*a*, and a second intermediate part 244*b*. The first side part 241 is formed between one outer leg 221 and one second inner core 232*a*, while the second side part 242 is formed between the other outer leg 222 and the other second inner core 232*b*. The first side part 241 and the second side part 242 each extends substantially linearly along the Z-axis direction, and extend from the upper end to the lower end of the base 21 in the Z-axis direction.

As shown in FIG. 6, the first intermediate part 244*a* is formed between the first inner core 231 and one second inner core 232*a*, while the second intermediate part 244*b* is formed between the first inner core 231 and the other second inner core 232*b*. The first intermediate part 244*a* and the second intermediate part 244*b* each extend substantially linearly along the Z-axis direction, and extend from the upper end to the lower end of the base 21 in the Z-axis direction. Note that the widths of each intermediate part in the X-axis direction may be different.

As shown in FIG. 6, upper part 243 of the groove is formed above the base 21 and extends along the X-axis direction. The upper part 243 connects the upper end of the first side part 241, the upper end of the second side part 242, the upper end of the first intermediate part 244*a*, and the upper end of the second intermediate part 244*b*.

As shown in FIG. 6, in the exemplary embodiment, the first conductor 30 includes a first conductor side 31, a second conductor side 32, a conductor top 33, a first mounting part 34, and a second mounting part 35.

As shown in FIG. 6, in the exemplary embodiment, the second conductor 40 includes an extension 40*a* extending along the first conductor 30, a first mounting part 44, and a second mounting part 45. Extension 40*a* includes conductor top 43, a second part extending closer to the first conductor 30, and the first conductor side 41 and the second conductor side 42, a first part extending away from the first conductor 30. The conductor top 43 is located at the top of the extension 40*a* in Z-axis direction, and extends along the X-axis direction closer to the conductor top 33 of the first conductor 30.

The first conductor side 41 is connected to one end of the conductor top 43 in the X-axis direction, while the second conductor side 42 is connected to the other end of the conductor top 43 in the X-axis direction. The first conductor side 41 and the second conductor side 42 extend along the Z-axis direction away from the conductor side 31 and 32 of the first conductor 30, respectively. There is a separation L4 between the first conductor side 41 of the second conductor 40 and the first conductor side 31 of the first conductor 30 shown in FIG.

As shown in FIG. 6, the conductor top 33 of the first conductor 30 and the conductor top 43 of the second conductor 40 are located in the upper part 243 of the groove 24. The first conductor side 31 of the first conductor 30 is located in the first side 241 of the groove 24. The second conductor side 32 of the first conductor 30 is located in the second side 242 of the groove 24. A first conductor side 41 of the conductor 40 is located at the first intermediate part 244*a*. A second conductor side 42 of the conductor 40 is located at the second intermediate part 244*b*.

The first inner core 231 is located between the first conductor side 41 and the second conductor side 42 of the second conductor 40 in the X-axis direction. The first inner core 231 is located between the conductor top 43 and the mounting parts 44 and 45 of the second conductor 40 in the Z-axis direction. The second inner core 232*a* is provided between the first conductor side 31 of the first conductor 30 and the first conductor side 41 of the second conductor 40 in the X-axis direction. The second inner core 232*b* is provided between the first conductor side 32 of the first conductor 30 and the first conductor side 42 of the second conductor 40 in the X-axis direction.

The width W1 of the first inner core 231 in the X-axis direction and the width W5 of the second inner cores 232*a* and 232*b* in the X-axis direction are not particularly limited. According to the cross-sectional area ratio S1/(S1+S2) of the embodiment, the cross-sectional area S2 may be calculated as the sum of the cross-sectional areas of the second inner cores 232*a* and 232*b* in the Y-axis direction. According to the coil device 10*b*, by changing the ratio of the width W1 of the first inner core 231 and the width W5 of the second inner cores 232*a* and 232*b*, the cross-sectional area ratio S1/(S1+S2) can be changed and the coupling coefficient K can be easily adjusted.

It should be noted that the above-described embodiments include embodiments with various design changes that are within the scope of the claims.

As shown in FIG. 6, in the coil device 10*b*, the inner core 23 is formed of one first inner core 231 and two second inner cores 232*a* and 232*b*. The first inner core 231 may be divided into pieces, and the second inner cores may be connected.

EXAMPLES

Hereinafter, the invention will be described based on examples, however, the examples are merely illustrations and the invention is not limited thereto.

Figure 8:
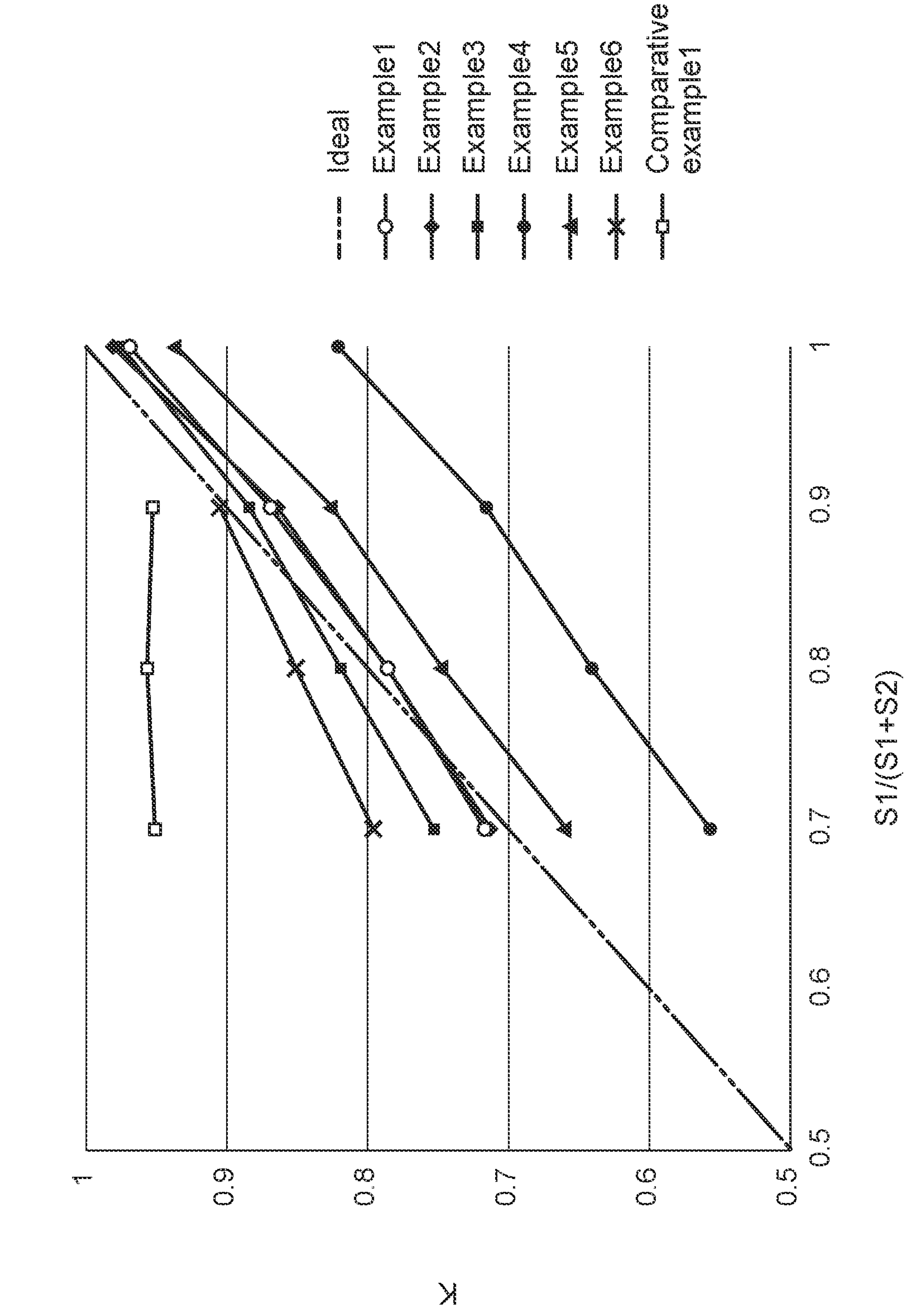
FIG. 8 is a graph showing the properties of the coil device.

In examples, the cross-sectional area ratio S1/(S1+S2), when the cross-sectional area of the first inner core 231 in the Y-axis direction is 51 and the cross-sectional area of the second inner core 232 in the Y-axis direction is S2, and the coupling coefficient K obtained by a computer simulation were compared. The results are shown in FIG. 8.

Example 1

In Example 1, the coupling coefficient K of the coil device 10 shown in FIG. 1A was determined by computer simulation. According to the magnetic cores 20*a* and 20*b*, materials of the first inner core 231, the second inner core 232, the outer legs 221 and 222, and the base 21 were all Mn—Zn ferrite, and the width W1 of the inner core 23 was kept constant and the height H1 of the first inner core 231 and the height H2 of the second inner core 232 were varied to set the cross-sectional area ratio S1/(S1+S2) to be 0.7, 0.8, 0.9 and 1. As shown in FIG. 8, in Example 1, it was confirmed that the coupling coefficient K was close to an ideal straight line, and changed approximately linearly in response to the value of the cross-sectional area ratio S1/(S1+S2).

Example 2

In Example 2, the coupling coefficient K of the coil device 10 shown in FIG. 1A was determined in the same manner as in Example 1, except that the dimension (L1) in the X-axis direction was doubled. As shown in FIG. 8, it was confirmed that almost the same results as in Example 1 were obtained in Example 2.

Example 3

In Example 3, as shown in FIG. 4, the coupling coefficient K was obtained in the same manner as in Example 1, except an I core 80 having the same material as the magnetic core was attached. In Example 3, as shown in FIG. 8, it was confirmed that the coupling coefficient K changed approximately linearly in response to the value of the cross-sectional area ratio S1/(S1+S2), as is the same with Example 1. In addition, it was confirmed that the coupling coefficient K of Example 3 is higher than the same of Example 1 when under the same conditions with Example 1.

Example 4

In Example 4, the coupling coefficient K of the coil device 10*a* shown in FIG. 5 was obtained in the same manner as in Example 1. In Example 4, a coil device having the same size as in Example 1 was used, and the material of the magnetic core 20*c* was a molding material using a metal magnetic material as the magnetic material and an epoxy resin as the resin material. In Example 4, as shown in FIG. 8, it was confirmed that the coupling coefficient K changed approximately linearly in response to the value of the cross-sectional area ratio S1/(S1+S2), as is the same with Example 1. In addition, it was confirmed that the coupling coefficient K of Example 4 is lower than the same of Example 1 when under the same conditions with Example 1.

Example 5

In Example 5, a coupling coefficient K was obtained in the same manner as in Example 1, except that in the magnetic cores 20*a* and 20*b*, the material of the first inner core 231, the second inner core 232, the outer leg parts 221 and 222, and the base 21 was a metal magnetic material including Fe—Si—Cr alloys. In Example 5, as shown in FIG. 8, it was confirmed that the coupling coefficient K changed approximately linearly in response to the value of the cross-sectional area ratio S1/(S1+S2), as is the same with Example 1. In addition, it was confirmed that the coupling coefficient K of Example 5 is lower than the same of Example 1 and higher than the same of Example 4 when under the same conditions with Example 1.

Example 6

In Example 6, a coupling coefficient K was obtained in the same manner as in Example 1, except a material of the second inner core 232 in the magnetic cores 20*a* and 20*b* was a metal magnetic material including Fe—Si—Cr alloys. In Example 6, the width W1 of the inner core 23 was kept constant and the height H1 of the first inner core 231 and the height H2 of the second inner core 232 were varied to set S1/(S1+S2) to be 0.7, 0.8, and 0.9. In Example 6, as shown in FIG. 8, it was confirmed that the coupling coefficient K changed approximately linearly in response to the value of the cross-sectional area ratio S1/(S1+S2), as is the same with Example 1. In Example 6, it was confirmed that the inclination of the coupling coefficient K was smaller than the same in Example 1 when the cross-sectional area ratio S1/(S1+S2) was in the range of 0.7 to 0.9. In addition, it was confirmed that the coupling coefficient K of Example 6 is higher than the same of Example 3 when under the same conditions with Example 1.

Comparative Example 1

In Comparative Example 1, the coupling coefficient K of the coil device 10 used in Example 1 was obtained in the same manner as in Example 1, except the part where the second inner core 232 is located was made hollow. In Comparative Example 1, the cross-sectional area ratio S1/(S1+S2) was obtained assuming that the second inner core 232 is present. As shown in FIG. 8, in Comparative Example 1, the coupling coefficient K merely changed even the cross-sectional area ratio S1/(S1+S2) varied.

Evaluation

As shown in FIG. 8, it was confirmed that the coupling coefficient K changed substantially linearly corresponding to the value of the cross-sectional area ratio S1/(S1+S2) in Examples 1 to 6, relative to the same in Comparative Example 1. In Examples 1 to 6, it was confirmed that the coupling coefficient K can be easily adjusted to a desired value within a predetermined range simply by changing the cross-sectional area ratio.

Example 7

The coil device 10 having a cross-sectional area ratio S1/(S1+S2) of 0.7, used in Example 1, was produced. According to the produced coil device 10, the inductance Lp of a primary coil between the mounting parts 34 and 35 in the first conductor 30 was measured. Also, the leakage inductance Le between the mounting part 34 of the first inner conductor 30 and the mounting part 44 of the second conductor 40 was measured, and then the coupling coefficient K was obtained. That is, when the coupling coefficient K was calculated from the equation $K=1-Le/Lp$, and the measured values of the inductance: Lp of the primary coil and the leakage inductance: Le according to the coil device 10, it was confirmed that the value substantially matches the simulation value obtained from the device having the cross-sectional area ratio S1/(S1+S2) of 0.7 as in Example 1.

EXPLANATION OF REFERENCES

10, 10*a*, 10*b* . . . Coil Device
20*a*, 20*b*, 20*c*, 20*d* . . . Magnetic Core
2*a* . . . First Surface
2*b* . . . Second Surface
2*c* . . . Third Surface
2*d* . . . Forth Surface
2*e* . . . Fifth Surface
2*f* . . . Sixth Surface
21 . . . Base
221 . . . First Outer Leg
222 . . . Second Outer Leg
23 . . . Inner Core
231 . . . First Inner Core
232, 232*a*, 232*b* . . . Second Inner Core
24 . . . Groove
241 . . . First Side Part
242 . . . Second Side Part
243 . . . Upper Part
244 . . . Intermediate Part
244*a* . . . First Intermediate Part
244*b* . . . Second Intermediate Part
251 . . . First Side Groove
252 . . . Second Side Groove
30 . . . First Conductor
31 . . . First Conductor Side
32 . . . Second Conductor Side
33 . . . Conductor Top
34 . . . First Mounting Part
35 . . . Second Mounting Part
36 . . . First Outer Bent Part
37 . . . Second Outer Bent Part
40 . . . Second Conductor
40*a* . . . Extension
41 . . . First Conductor Side
42 . . . Second Conductor Side
43 . . . Conductor Top
44 . . . First Mounting Part
45 . . . Second Mounting Part
46 . . . First Outer Bent Part
47 . . . Second Outer Bent Part
70 . . . Insulating Layer
80 . . . I Core
100 . . . Electronic Circuit

What is claimed is:

1. A coil device comprising:
a first conductor;
a second conductor located inside the first conductor;
a first inner core located inside the second conductor; and
a second inner core located between the first conductor and the second conductor, wherein
the second conductor comprises an extension extending along the first conductor,
the extension comprises a first part, extending away from the first conductor, and a second part, extending closer to the first conductor than the first part,
a first interval between the first conductor and the first part is bigger than a second interval between the first conductor and the second part, and
the second inner core is located within the first interval between the first part and the first conductor.

2. The coil device according to claim 1 further comprising an outer leg, wherein the outer leg and the first inner core form a closed magnetic circuit.

3. The coil device according to claim 1, wherein the first inner core and the second inner core comprise the same magnetic material.

4. The coil device according to claim 1, wherein the first inner core and the second inner core each comprises a different magnetic material.

5. The coil device according to claim 4, wherein the material of the second inner core has a lower magnetic permeability than the material of the first inner core.

6. The coil device according to claim 1, wherein the first inner core and the second inner core comprise a molding material including a magnetic material and a resin material.

7. An electronic circuit comprising the coil device according to claim 1.

8. The electronic circuit according to claim 7, comprising multiple coil devices.

* * * * *